United States Patent
Dobreski et al.

(12)

(10) Patent No.: US 6,376,035 B1
(45) Date of Patent: *Apr. 23, 2002

(54) ZIPPER FINS FOR PLASTIC BAGS

(75) Inventors: David V. Dobreski, Fairport; Steve P. Long, Canandaigua, both of NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/309,001

(22) Filed: May 10, 1999

Related U.S. Application Data

(63) Continuation-in-part of application No. 08/759,445, filed on Dec. 5, 1996, now Pat. No. 5,919,535.

(51) Int. Cl.[7] .......................... B29D 22/00; B32B 27/32; B65D 33/16

(52) U.S. Cl. ..................... 428/35.2; 428/35.7; 428/521; 428/523; 383/64

(58) Field of Search ...................... 383/64, 5; 428/515, 428/521, 523, 35.2, 36.97, 35.7

(56) References Cited

U.S. PATENT DOCUMENTS

| | | | |
|---|---|---|---|
| 4,808,561 A | 2/1989 | Welborn, Jr. | 502/104 |
| 4,871,523 A | 10/1989 | Datta et al. | 423/265 |
| 4,871,705 A | 10/1989 | Hoel | 502/117 |
| 4,896,775 A | * 1/1990 | Boeckmann et al. | 206/557 |

(List continued on next page.)

FOREIGN PATENT DOCUMENTS

| | | |
|---|---|---|
| EP | 0 371 402 | 6/1990 |
| EP | 0 566 363 A1 | 10/1993 |
| EP | 0 600 425 A1 | 6/1994 |
| EP | 0 505 055 | 3/1995 |
| EP | 0 505 059 | 8/1996 |
| EP | 0 505 069 | 10/1996 |
| EP | 0 505 057 | 11/1996 |
| EP | 0 505 068 | 5/1997 |
| EP | 0 801 003 A2 | 10/1997 |
| WO | WO 94/25271 | 11/1994 |
| WO | WO 94/26816 | 11/1994 |
| WO | WO 95/29604 | 11/1995 |
| WO | WO 95/35046 | 12/1995 |
| WO | WO 95/35047 | 12/1995 |
| WO | WO 95/35048 | 12/1995 |
| WO | WO 98/24704 | 6/1998 |
| WO | WO 98/45180 | 10/1998 |

OTHER PUBLICATIONS

Schut, Jan H., "Competition For Metallocenes Could Turn Ugly," *Plastics World*, pp. 33–36 (Jan. 1995).

*Primary Examiner*—Rena L. Dye
*Assistant Examiner*—Michael C. Higgins
(74) *Attorney, Agent, or Firm*—Jenkens & Gilchrist

(57) ABSTRACT

A plastic bag comprises first and second panels each having a top, a bottom, and first and second opposing sides. The first and second panels are joined to each other along their respective bottoms, their respective first opposing sides, and their respective second opposing sides. The plastic bag includes a zipper having a male and female track. The male track includes a male profile and a first fin, in which the first fin is affixed to the first panel in proximity to the top of said first panel. The female track includes a female profile and a second fin, in which the second fin is affixed to the second panel in proximity to the top of said second panel. The male and female profiles having complementary cross-sections. The inventive fins comprise a first resin and, optionally, a second resin which, along with the fins seals, are able to withstand greater forces and more adverse conditions. At least one of the fins comprises a first resin having a polydispersity of about 1 to about 4, a melt index of about 0.2 to about 20, and a melt flow ratio of about 12 to about 35. The second resin, if used, may either be coextruded or blended with the first resin.

66 Claims, 3 Drawing Sheets

U.S. PATENT DOCUMENTS

| | | | | |
|---|---|---|---|---|
| 4,925,318 A | 5/1990 | Sorensen | | 383/63 |
| 4,925,821 A | 5/1990 | Change | | 502/107 |
| 4,937,301 A | 6/1990 | Chang | | 526/128 |
| 4,971,454 A | 11/1990 | Branson et al. | | 383/61 |
| 5,001,205 A | 3/1991 | Hoel | | 526/128 |
| 5,004,356 A | 4/1991 | Matsui | | 383/63 |
| 5,006,500 A | 4/1991 | Chang | | 502/107 |
| 5,007,142 A | 4/1991 | Herrington | | 24/400 |
| 5,007,143 A | * 4/1991 | Herrington | | 24/400 |
| 5,010,627 A | 4/1991 | Herrington et al. | | 24/400 |
| 5,017,021 A | 5/1991 | Simonsen et al. | | 383/63 |
| 5,017,655 A | 5/1991 | Kase et al. | | 525/127 |
| 5,020,194 A | 6/1991 | Herrington et al. | | 24/400 |
| 5,026,798 A | 6/1991 | Canich | | 526/127 |
| 5,032,652 A | 7/1991 | Chang | | 526/129 |
| 5,050,736 A | 9/1991 | Griesbach et al. | | 206/484 |
| 5,063,069 A | 11/1991 | Van Erden et al. | | 426/122 |
| 5,063,644 A | 11/1991 | Herrington et al. | | 24/400 |
| 5,067,208 A | 11/1991 | Herrington, Jr. et al. | | 24/400 |
| 5,070,194 A | 12/1991 | Sasoka et al. | | 540/214 |
| 5,070,583 A | 12/1991 | Herrington | | 24/400 |
| 5,079,205 A | 1/1992 | Canich | | 502/117 |
| 5,084,534 A | 1/1992 | Welborn, Jr. et al. | | 526/160 |
| 5,088,971 A | 2/1992 | Herrington | | 493/203 |
| 5,124,418 A | 6/1992 | Welborn, Jr. | | 526/114 |
| 5,131,121 A | * 7/1992 | Herrington, Jr. et al. | | 24/436 |
| 5,152,613 A | 10/1992 | Herrington, Jr. | | 383/63 |
| 5,161,286 A | 11/1992 | Herrington, Jr. et al. | | 24/387 |
| 5,183,867 A | 2/1993 | Welborn, Jr. | | 526/114 |
| 5,185,909 A | 2/1993 | Inagaki | | 24/587 |
| 5,188,461 A | 2/1993 | Sorensen | | 383/63 |
| 5,189,764 A | 3/1993 | Herrington et al. | | 24/387 |
| 5,206,075 A | 4/1993 | Hodgson, Jr. | | 428/216 |
| 5,238,306 A | 8/1993 | Heintz et al. | | 383/61 |
| 5,272,236 A | 12/1993 | Lai et al. | | 526/348.5 |
| 5,273,809 A | 12/1993 | Simmons | | 428/212 |
| 5,279,693 A | 1/1994 | Robinson et al. | | 156/272.8 |
| 5,283,932 A | 2/1994 | Richardson et al. | | 24/400 |
| 5,301,394 A | 4/1994 | Richardson et al. | | 24/399 |
| 5,301,395 A | 4/1994 | Richardson et al. | | 24/400 |
| 5,330,269 A | 7/1994 | Kamada et al. | | 383/210 |
| 5,358,792 A | * 10/1994 | Mehta et al. | | 428/516 |
| 5,380,810 A | 1/1995 | Lai et al. | | 526/352 |
| 5,382,631 A | * 1/1995 | Stehling et al. | | 525/240 |
| 5,405,478 A | 4/1995 | Richardson et al. | | 156/308.4 |
| 5,415,904 A | 5/1995 | Takubo et al. | | 428/35.2 |
| 5,426,830 A | 6/1995 | Richardson et al. | | 24/430 |
| 5,431,760 A | 7/1995 | Donovan | | 156/66 |
| 5,442,837 A | 8/1995 | Morgan | | 24/400 |
| 5,442,838 A | 8/1995 | Richardson et al. | | 24/402 |
| 5,448,807 A | 9/1995 | Herrington, Jr. | | 24/399 |
| 5,448,808 A | 9/1995 | Gross | | 24/400 |
| 5,482,375 A | 1/1996 | Richardson et al. | | 383/64 |
| 5,523,136 A | 6/1996 | Fischer et al. | | 428/35.2 |
| 5,645,905 A | * 7/1997 | Takubo et al. | | 428/35.7 |
| 5,669,715 A | 9/1997 | Dobreski et al. | | 383/5 |
| 5,682,730 A | 11/1997 | Dobreski | | 53/469 |
| 5,775,812 A | * 7/1998 | St. Phillips et al. | | 383/5 |
| 5,851,070 A | 12/1998 | Dobreski et al. | | 383/63 |
| 5,919,535 A | * 7/1999 | Dobreski et al. | | 428/35.2 |

* cited by examiner

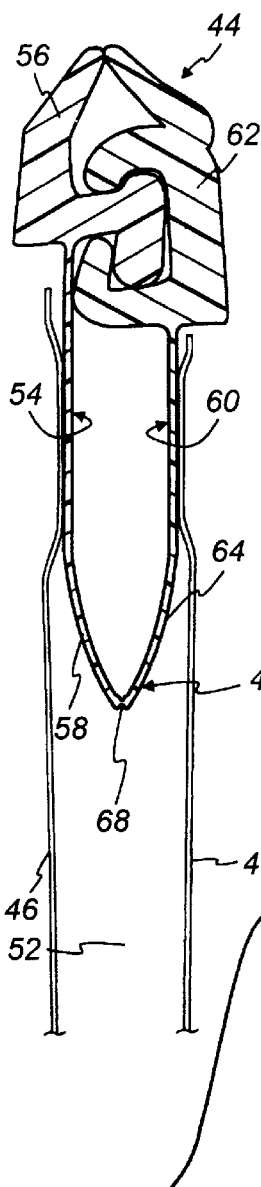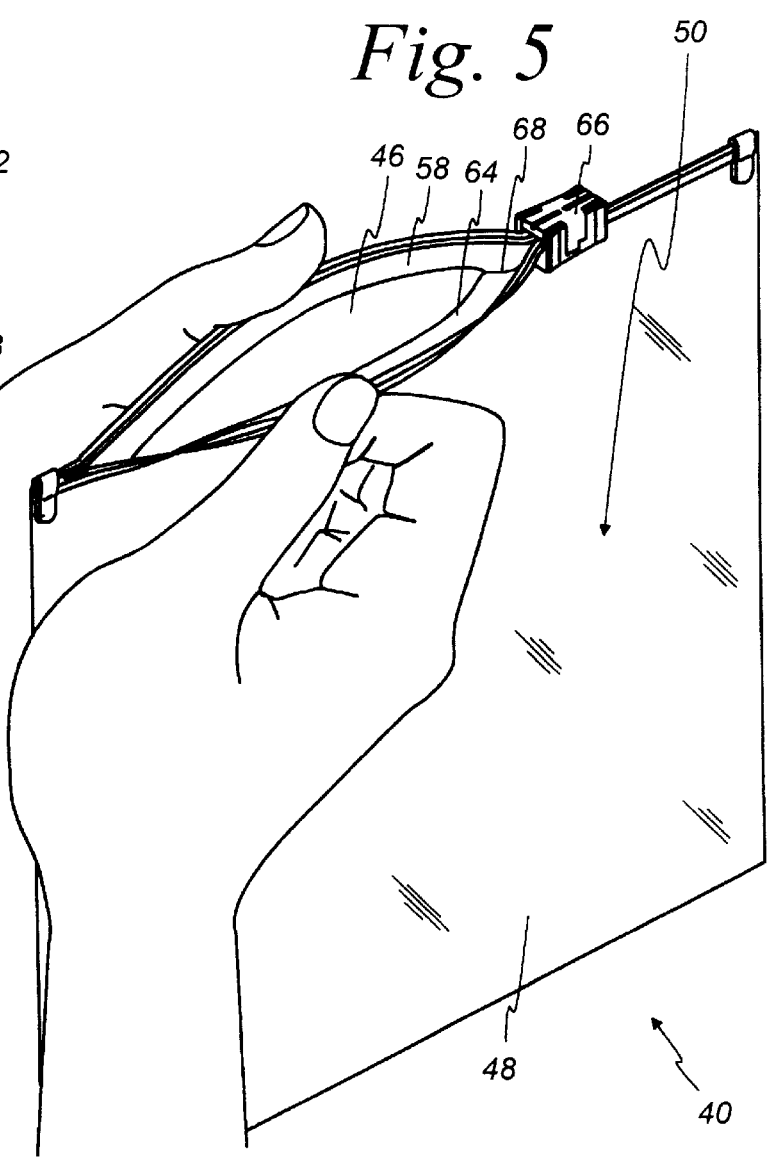
Fig. 4
Fig. 5

ZIPPER FINS FOR PLASTIC BAGS

RELATED APPLICATION

This application is a continuation-in-part of U.S. patent application No. 08/759,445, filed Dec. 5, 1996, which has issued as U.S. Pat. No. 5,919,535.

FIELD OF THE INVENTION

The present invention relates generally to plastic bags. More particularly, the present invention relates to the use of particular polymers in food bags to strengthen the fins and fin seals that attach the zipper to the bag.

BACKGROUND OF THE INVENTION

The use of plastic bags is increasingly more common in the marketplace. A factor affecting their acceptance and range of application, however, is the strength and reliability of the bags and the seals.

Plastic bags are in widespread use in a varied and diverse number of household and commercial applications. The primary advantage of plastic bags is their ease of opening and resealing. The plastic bag includes first and second opposing body panels fixedly connected to each other along a pair of sides and a bottom, in which the bottom extends between the pair of sides. The plastic bag includes a fastener, such as a zipper, extending along a mouth formed opposite the bottom of the plastic bag. The zipper includes a male track and a female track. The male track includes a male profile and a first depending fin or flange extending downward from the male profile. Likewise, the female track includes a female profile and a second depending fin or flange extending downward from the female profile. The first and second fins may be extruded separately from the body panels and then thermally fused to inner surfaces of the respective first and second body panels.

The male and female tracks may be rolled or pressed into their interlocking arrangement so as to securely close the bag by one of two means. First, the tracks are rolled or pressed together at one end by a user and then sequentially fitted together along the length of the zipper by the user running a finger along the length of the zipper on each side of the tracks. Alternatively, some bags employ a plastic slider that rides along the tracks of the zipper. If the slider is pulled in one direction, the bag is sealed shut; if the slider is pulled in the opposite direction, the bag is reopened.

Plastic bags with a zipper-type closure mechanism typically have at least two types of seals. One type of seal ("side seal") seals a first body panel to a second opposing body panel along the sides of the plastic bag. A second type of seal ("fin seal") is created when a plastic fin is used to attach the zipper-type closure mechanism to the body panels. Since the popularity of these bags has placed increased demands on the tasks they are asked to perform, a need exists for bags having fin seals that are able to withstand increased forces and more adverse conditions.

SUMMARY OF THE INVENTION

It is an object of the present invention to create plastic bags that have fins and fin seals that are able to withstand greater forces and more adverse conditions than previous bags.

The present invention improves performance of the fin seal by making the fin out of resins that have a narrow molecular weight distribution or polydispersity ($M_w/M_n$ or MWD). The inventive fin comprises a first resin and, optionally, a second resin.

According to one embodiment of the present invention, a zippered plastic bag has first and second panels, a zipper and a slider. The zipper includes a male and female track. The male track includes a male profile and a first fin portion. The first fin portion is affixed to the first panel in proximity to the top of the first panel. The female track includes a female profile and a second fin portion. The second fin portion is affixed to the second panel in proximity to the top of the second panel. The male and female profiles have complementary cross-sections. The first and second fin portions are attached. At least one of the fin portions is made from a first resin which is prepared in the presence of a single site catalyst and a second resin. The first resin has a polydispersity of from about 2 to about 3, a melt index of from about 0.2 to about 20 g/10 min., and a melt flow ratio of from about 12 to about 35. The second resin is a low density polyethylene. At least one of the fin portions comprises from about 5 to about 50 wt. % of the first resin, and from about 50 to about 95 wt. % of the second resin.

According to another embodiment of the present invention, a zippered plastic bag has first and second panels, a zipper and a slider. The zipper includes a male and female track. The male track includes a male profile and a first fin portion. The first fin portion is affixed to the first panel in proximity to the top of the first panel. The female track includes a female profile and a second fin portion. The second fin portion is affixed to the second panel in proximity to the top of the second panel. The male and female profiles have complementary cross-sections. The first and second fin portions are attached. At least one of the fin portions is made from a first resin selected from the group consisting of an ultra low density polyethylene, a very low density polyethylene, a metallocene-catalyzed linear low density polyethylene, and an elastomer. The first resin has a polydispersity of from about 1 to about 4, a melt index of from about 0.2 to about 20 g/10 min., and a melt flow ratio of from about 12 to about 35, and a second resin is a low density polyethylene. At least one of the fin portions comprises from about 5 to about 50 wt. % of the first resin, and from about 50 to about 95 wt. % of the second resin.

According to a further embodiment of the present invention, a fastener comprises a male track and the female track. At least one of the fin portions is made from a first resin which is prepared in the presence of a single site catalyst. The first resin has a polydispersity of from about 2 to about 3, a melt index of from about 0.2 to about 20 g/10 min., and a melt flow ratio of from about 12 to about 35. A second resin is a low density polyethylene. At least one of the fin portions comprises from about 5 to about 50 wt. % of the first resin, and from about 50 to about 95 wt. % of the second resin. Alternatively, at least one of the fin portions comprises from about 50 to 100 wt. % of the first resin, and from 0 to about 50 wt. % of the second resin.

Alternatively, at least one of the fin portions of the fastener may be made from a first resin selected from the group consisting of an ultra low density polyethylene, a very low density polyethylene, a metallocene-catalyzed linear low density polyethylene, and an elastomer. The first resin has a polydispersity of from about 1 to about 4, a melt index of from about 0.2 to about 20 g/10 min., and a melt flow ratio of from about 12 to about 35, and a second resin is a low density polyethylene. Alternatively, at least one of the fin portions is made from an ultra low density polyethylene, a very low density polyethylene and a metallocene-catalyzed linear low density polyethylene comprising from about 50 to about 90 wt. % of the first resin, and from about 10 to about 50 wt. % of the second resin. The fastener may also have at least one of the fin portions made from an elastomer comprising from about 50 to 100 wt. % of the first resin, and from 0 to about 50 wt. % of the second resin.

According to yet another embodiment of the present invention, a zippered plastic bag has first and second panels, a zipper and a slider. At least one of the fin portions is made from a first resin which is prepared in the presence of a single site catalyst. The first resin has a polydispersity of from about 2 to about 3, a melt index of from about 0.2 to about 20 g/10 min., and a melt flow ratio of from about 12 to about 35. A second resin is a low density polyethylene. At least one of the fin portions comprises from about 50 to 100 wt. % of the first resin, and from 0 to about 50 wt. % of the second resin.

According to another embodiment of the present invention, a zippered plastic bag has first and second panels, a zipper and a slider. At least one of the fin portions is made from a first resin that is an ultra low density polyethylene, elastomer, metallocene-catalyzed linear low density polyethylene, or a very low density polyethylene. The first resin has a polydispersity of from about 1 to about 4, a melt index of from about 0.2 to about 20 g/10 min., and a melt flow ratio of from about 12 to about 35. A second resin is a low density polyethylene. At least one of the fin portions comprises from about 50 to about 90 wt. % of the first resin, and from about 10 to about 50 wt. % of the second resin.

According to one aspect of the invention, the first resin is a polymer having a narrow molecular weight distribution or polydispersity of from about 1 to about 4, a melt index of from about 0.2 to about 20, and a melt flow ratio ($I_{20}/I_2$) of from about 12 to about 35. Examples of the first resins are linear low density polyethylenes (LLDPE) and metallocene-catalyzed LLDPE. Use of narrow molecular weight distribution resins, like the first resin, results in fin seals which are stronger, tougher, and less likely to leak. The second resin is a polymer, such as low density polyethylene (LDPE), LLDPE, or a blend thereof.

In fins comprising both a first and a second resin, the first resin may be coextruded with a second resin as a thin layer of the fin or may be blended with the second resin. Preferably, the fins are formed entirely of the first resin. In one embodiment, a thin layer of the first resin having a narrow molecular weight distribution is coextruded with at least one of the following of the second resins: LDPE resin, LLDPE resin, or a LDPE/LLDPE blend. The term "layer," as used herein, shall include any coating, film, lamination coextrusion, or the like.

BRIEF DESCRIPTION OF THE DRAWINGS

FIG. 4 is a section view of a mouth portion of a recloseable bag having a tamper proof feature formed by joined fin portion located below a recloseable fastener.

FIG. 5 is a perspective view of the recloseable bag incorporating the mouth portion depicted in FIG. 4 in which a recloseable fastener having a slider mechanism is opened and the tamper proof feature formed by joined fins is partially opened.

Figure 3:
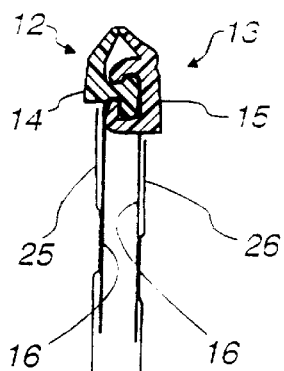
FIG. 3 is a cross-sectional view taken generally along lines 3—3 in FIG. 2.

While the invention is susceptible to various modifications and alternative forms, a specific embodiment thereof has been shown by way of example in the drawings and will herein be described in detail. It should be understood, however, that it is not intended to limit the invention to the particular forms disclosed but, on the contrary, to cover all modifications, equivalents, and alternatives falling within the spirit and scope of the invention as defined by the appended claims.

DETAILED DESCRIPTION OF THE INVENTION

Figure 1:
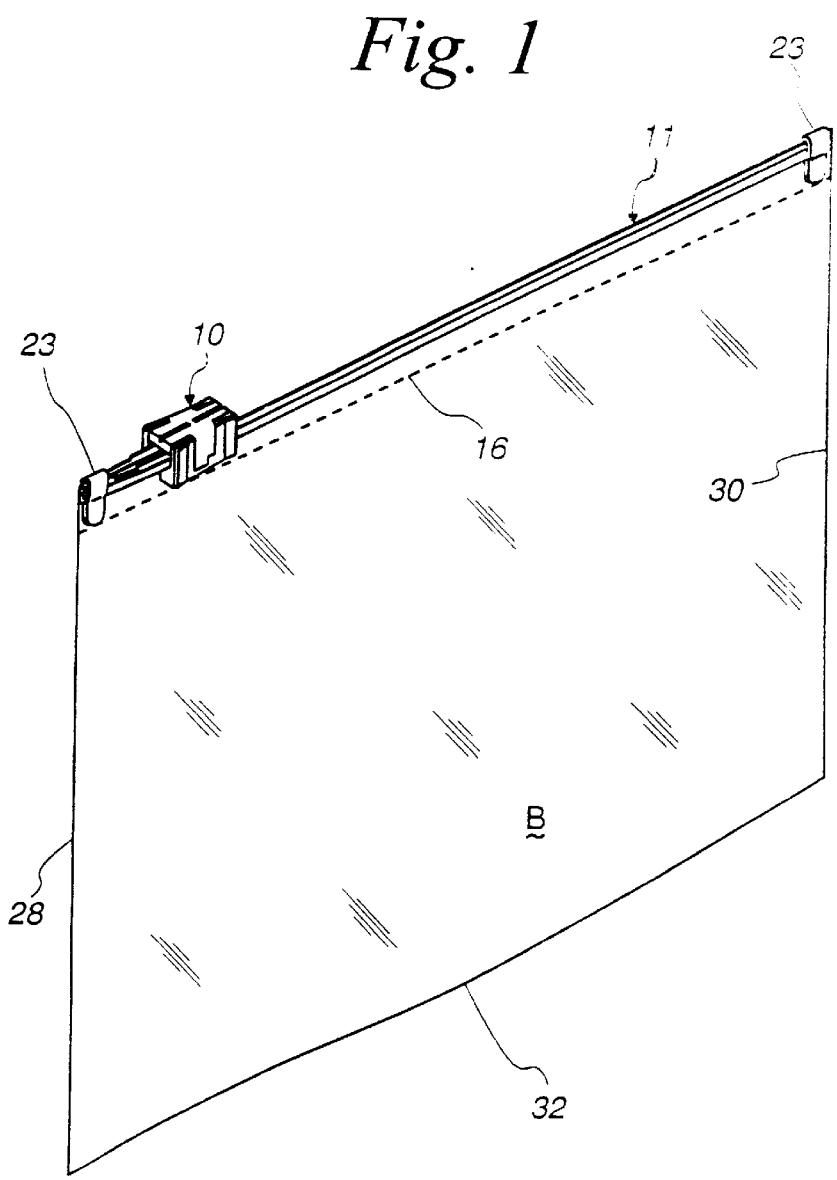
FIG. 1 is a perspective view of a thermoplastic bag having a fastener and slider.

Referring to FIG. 1, there is illustrated a plastic slider 10 and a profiled plastic fastener or zipper 11. The slider 10 and zipper 11 are particularly suited for thermoplastic bags and the like. Slider 10 has been illustrated in FIG. 2 assembled on the zipper 11 at the top edge or mouth of a thermoplastic bag or package B. The plastic slider 10 and the profiled zipper 11 cooperate to close the bag B. In a preferred embodiment, the bag B (as shown in FIGS. 1 and 3) is formed from a single flexible plastic sheet folded upon itself and comprises first and second opposing body panels 25 and 26. Body panels 25 and 26 are fixedly connected to each other along a pair of sides 28 and 30 and a bottom 32 which extends between the pair of sides 28 and 30. Bag B preferably has the zipper 11 extending along a mouth formed opposite the bottom 32 of bag B, in which the zipper 11 has a male track 12 and a female track 13.

Figure 2:
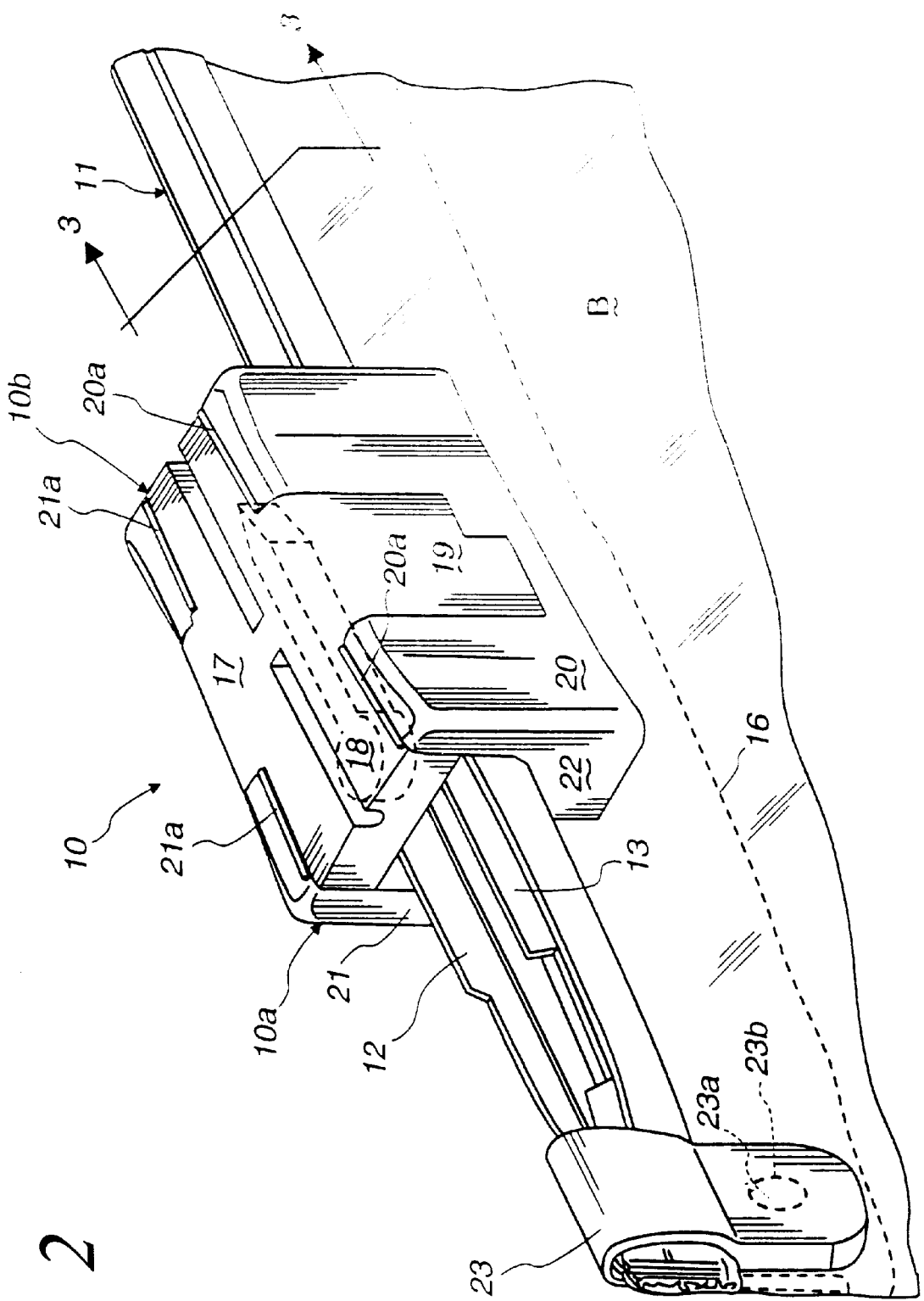
FIG. 2 is an enlarged perspective view of the fastener and slider of FIG. 1 in assembled position on a thermoplastic bag.

As shown in FIGS. 2 and 3, tracks 12 and 13 have interlocking male and female profiles 14 and 15 extending the length thereof in the form of rib and groove elements on the respective tracks. The tracks 12 and 13 may be extruded separately with a fin and attached to the respective sides of the bag mouth, or may be extruded integrally with the sides of the bag mouth. If the tracks 12 and 13 are extruded separately, they are most effectively attached by means of a respective first and second fin 16, incorporated within the tracks, that is heat sealed to the bag mouth. The fins 16 may be attached to each other and will be described in more detail below. The male and female profiles 14 and 15 have complementary cross-sectional shapes and are closed by pressing a bottom of the elements together first and then rolling the elements to a closed position toward the top thereof. The cross-sectional shapes of the interlocking male and female profiles 14 and 15 are the subject of the invention claimed in U.S. Pat. No. 5,007,143, which is incorporated herein by reference.

As may be seen in FIG. 2, the slider 10 straddles the zipper 11 at the top of the bag B and is adapted for opening or closing the interlocking tracks 12 and 13 of the zipper 11. The slider 10 may be molded from any suitable plastic such as, for example, nylon, polypropylene, polyethylene, polystyrene, Delrin, or ABS.

In a preferred embodiment, shown in FIG. 2, the slider 10 comprises an inverted U-shaped member including a transverse support member or body 17 from which the separator finger 18 extends downward. The body 17 is itself U-shaped and includes two integral legs 19 extending downward. The finger 18 is positioned between the legs 19. The body 17 is adapted to move along the top edges of the tracks 12 and 13 with the legs 19 straddling these elements and the finger 18 positioned between the tracks 12 and 13. The slider 10 also includes a pair of hinged "wings" 20 and 21 that can be folded down into their final position. The wings 20 and 21 are hinged to the main slider body 17 by means of hinge structures 20a and 21a located at the opposite ends of the legs 19.

The foldable depending wings or side walls 20 and 21 extend from an opening end 10a of the slider 10 to a closing end 10b. It will also be noted that the main slider body 17 and the separator finger 18 are wider at the opening end 10a than at the closing end 10b. Similarly, the side walls 20 and 21 and the legs 19 are spaced wider apart at the opening end 10a of the slider 10 to permit separation of the male and female profiles 14 and 15 by the finger 18 engaging the tracks 12 and 13. The wings 20 and 21 and legs 19 are spaced sufficiently close together at the closing end 10b of the slider to press the male and female profiles 14 and 15 into an interlocking relationship as the slider 10 is moved in a fastener closing direction. As shown in FIG. 2, the side walls 20 and 21 at their lower ends are provided with an inwardly extending shoulder structure 22. Shoulder structure 22 engages a bottom of the zipper 11 to prevent slider 10 from being lifted off the edges of the tracks 12 and 13, while the slider 10 straddles the zipper 11.

The opposite ends of the zipper 11 are provided with end termination clips 23. Each of the end clips 23 is identical and is best shown in FIG. 2. Each end clip 23 comprises a strap member which wraps over the top of the zipper 11. One end of the strap is provided with a rivet-like member 23a which is adapted to penetrate through the bag material and into a cooperating opening 23b at the other end of the clip 23. The rivet 23a is then deformed so as to create a head locked into the opening 23b.

Turning now to another embodiment of the present invention, FIG. 4 depicts a mouth portion of a recloseable package having a tamper evident feature 42 located below a recloseable closure arrangement or zipper 44. FIG. 5 shows a recloseable package or bag 40 incorporating the mouth portion depicted in FIG. 4. The mouth portion of the recloseable package 40 includes a pair of opposing wall panels 46 and 48 of polymeric film which make up a package body 50 and define a receptacle space 52. Connected to the wall panel 46 is a first track 54 having a first profile 56 and a first fin portion 58 extending downward from the first profile 56. Connected to the other wall panel 48 is a second track 60 having a second profile 62 and a second fin portion 64 extending downward from the second profile 62. The first and second profiles 56 and 62 are releasably engageable with each other to provide a recloseable seal to the package. In the illustrated embodiment, the lower edges of the first and second fin portions 58 and 64 are joined to each other along a one time breakable preferential area of weakness or preferential tear area 68 to form a one time openable tamper evident feature. The joined first and second fin portions 58 and 64 have a generally U-shaped or V-shaped cross-sectional configuration.

To join the first and second fin portions 58 and 64, the fin portions 58 and 64 may be formed as a single continuous fin having the preferential area of weakness 68. In one embodiment, the preferential area of weakness 68 takes the form of a perforated line, score line, or thinned line. A score line is created by making a uniform crease at the intersection of the fin portions 58 and 64. A thinned line is created by forming the fin portions 58 and 64 with less plastic material along the region joining lower edges of the fin portions 58 and 64. In another embodiment, the preferential area of weakness 68 results from forming the single continuous fin out of highly oriented plastic that has a tendency to split along the preferential area of weakness 68.

Instead of forming the first and second fin portions 58 and 64 as a single continuous fin, the first and second fin portions 58 and 64 may be separately extruded and then later weakly attached at their lower edges or some other location by heat sealing, welding, or the like. The weak attachment of the first and second fin portions 58 and 64 creates the preferential area of weakness 68.

The recloseable package 40 further has an auxiliary slider 66 (FIG. 5) slidably mounted to the closure arrangement 44 for movement between a closed position and an open position. The first and second profiles 56 and 62 are engaged to each other, while the slider 66 is in the closed position, and movement of the slider 66 from the closed position to the open position disengages the profiles 56 and 62 from each other. The composition and manner of operation of this zipper and slider arrangement is described in detail in U.S. Pat. No. 5,067,208 to Herrington, Jr. et. al., which is incorporated herein by reference in its entirety.

As illustrated in FIG. 5, in order to open the recloseable package of the instant invention, a consumer grips the slider 66 and moves it such that the profiles 56 and 62 of the respective first and second tracks 54 and 60 are detached from each other. Next, the consumer tears open the tamper evident feature along the preferential area of weakness 68 joining the lower edges of the first and second fin portions 58 and 64. The bag can be resealed utilizing the recloseable closure arrangement 44 and slider 66. Specifically, the consumer grips the slider mechanism 66 and moves it from the open position to the closed position so as to engage the complementary closure profiles 56 and 62.

Other embodiments of a one time tamper evident feature are contemplated, such as those discussed in U.S. application Ser. No. 08/694,093, filed Aug. 8, 1996, entitled "Recloseable Fastener Strip with Tamper Evident Feature," which is incorporated herein by reference in its entirety.

The fins 16 of the present invention comprise at least one resin which possesses excellent resistance to stress cracking and superior fin seal strength when heat sealed to a body panel. These fins 16 significantly reduce fin seal failure caused by contact with hot and/or acidic foods in comparison to control low density polyethylene (LDPE) fins. The fin portions 58 and 64 also comprise at least one resin that possesses excellent resistance to stress cracking and superior fin strength when heat sealed to a body panel.

The first resin is comprised of a copolymer prepared, preferably, in the presence of a single site catalyst with ethylene and at least one alpha olefin monomer, e.g., a copolymer or terpolymer. The alpha olefin monomer generally has from 3 to 12 carbon atoms, preferably from 4 to 10 carbon atoms, and more preferably from 6 to 8 carbon atoms. The alpha olefin comonomer content is generally below about 30 wt. %, preferably below about 20 wt. %, and more preferably from about 1 to about 15 wt. %. Exemplary comonomers include propylene, 1-butene, 1-pentene, 1-hexene, 3-methyl-1-pentene, 4-methyl-1-pentene, 1-octene, 1-decene, and 1-dodecene.

The average molecular weight of the first resin can generally range from about 20,000 to about 500,000, and preferably from about 50,000 to about 200,000. The molecular weight is determined by commonly used techniques such as size exclusion chromatography or gel permeation chromatography. The first resin has a polydispersity within the range of from about 1 to about 4, preferably from about 1.5 to about 4, more preferably from about 2 to about 4, and even more preferably from about 2 to about 3. The first resin has a ratio of the third moment to the second moment, $M_z/M_w$, is generally below 2.3, preferably below 2.0, and more typically from about 1.6 to about 1.95. The melt flow ratio (MFR) of these resins, defined as $I_{20}/I_2$ and determined in accordance with ASTM D-1238, is generally from about 12 to about 35, preferably from about 12 to about 31, and more preferably from about 12 to about 20. The melt index (MI), defined as the $I_2$ value, should be in the range of from about 0.2 to about 20, and preferably from about 1 to about 17. The first resin has a density of from about 0.85 to about 0.94 g/cm$^3$, preferably from about 0.88 to about 0.925 g/cm$^3$, and more preferably from about 0.88 to about 0.920 g/cm$^3$.

Resin materials which may be used for the first resin are available from, among others, Dow Chemical Company and Exxon Chemical Company which produce single site or constrained geometry-catalyzed polyethylenes. These resin materials are commercially available as the AFFNITY and EXXACT polyethylenes (see *Plastics World*, pp. 33–36, January 1995), and also as the ENHANCED POLYETHYLENE and EXCEED line of resins. The polyethylenes include at least the following: LLDPE, ultra low density polyethylene, and very low density polyethylene. The manufacture of such polyethylenes, generally by way of employing a metallocene catalyst system, is set forth in, among others, U.S. Pat. Nos. 5,382,631, 5,380,810, 5,358,792, 5,206,075, 5,183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is hereby incorporated herein by reference in its entirety. These catalyst systems and their use to prepare such resin materials are also set forth in EP 0 600 425 A1 and International Publication Nos. WO 94/25271 and 94/26816. The polyethylene resins produced generally have a crystalline content in excess of at least 10 wt. %, and generally in excess of at least 15 wt. %. In a preferred embodiment, metallocene catalysts are utilized, but other catalysts, such as single site catalysts, are available as equivalent substitutes.

The above patents and publications generally report that these metallocene catalysts contain one or more cyclopentadienyl moieties in combination with a transition metal. The metallocene catalyst may be represented by the general formula $C_cMA_aB_b$, wherein C is a substituted or unsubstituted cyclopentadienyl ring; M is a Group 3–10 metal or Lanthanide series element, generally a Group IVB, VB, or VIB metal; A and B are independently halogens, hydrocarbyl groups, or hydrocarboxyl groups having 1–20 carbon atoms; a=0–3, b=0–3, and c=1–3. The reactions can take place in either gas phase, high pressure, slurry, or solution polymerization schemes.

The fins 16 of the present invention are preferably constructed entirely of a first resin, i.e., polymers having a narrow molecular weight distribution. The fins 16 may also be constructed from a combination of the first resin with a second resin material. The fins 16 which comprise the first resin may contain the first resin in an amount ranging from at least about 5 to 100 wt. %. Other ranges contemplated include the first resin ranging from at least 5 to about 50 or about 75 wt. %. At the present time, however, from an economic viewpoint, it is more desirable to have the fins 16 comprise from about 5 to about 25 wt. % first resin and most preferably at least about 10 to about 15 wt. % first resin.

The second resin material is preferably a linear low density polyethylene (LLDPE) resin having a density of from about 0.89 to about 0.94 g/cm$^3$, an LDPE resin having a density of from about 0.88 to about 0.935 g/cm$^3$, or a blend of the LLDPE and LDPE resins. The LLDPE is generally prepared by polymerizing ethylene with a comonomer which preferably has from 4 to 10 carbon atoms, and more preferably 6–8 carbon atoms.

The first resin and the second resin may be incorporated into a fin in a number of ways. Second resins, such as LDPE and LLDPE resins or the LDPE/LLDPE blend, may be blended with the first resin prior to extrusion so as to create a multicomponent fin. Further, in a preferred embodiment, a thin layer of the first resin is coextruded with the LDPE or LLDPE resins or the LDPE/LLDPE blend. Additional resins are also contemplated, such as having a first resin coextruded with both the LDPE and LLDPE resins.

The fin portions 58 and 64 may be constructed entirely of a first resin, i.e., polymers having a narrow molecular weight distribution. The fin portions 58 and 64 may also be constructed from a combination of the first resin with a second resin material. The fin portions 58 and 64 which comprise the first resin may contain the first resin in an amount ranging from at least about 5 to 100 wt. %. Other ranges contemplated include the first resin ranging from at least 5 to about 50 or about 75 wt. % of the fin portions. At the present time, however, from an economic viewpoint, it is more desirable to have the fin portions 58 and 64 comprise from about 5 to about 25 wt. % of the first resin or from about 10 to about 15 wt. % of the first resin.

For example, at least one fin portion may be made from a first resin prepared from a single site catalyst with a polydispersity of from about 2 to about 3 in an amount from about 50 to 100 wt. % of the fin portion. The first resin may be in an amount of from about 50 to about 90 wt. % or from about 60 to about 85 wt. % of the fin portion. From an economic viewpoint at the present time, it may be more desirable to have the first resin present in a reduced amount. For example, the first resin may be present in an amount of from about 50 to about 75 wt. % of the fin portion or from about 50 to about 60 wt. % of the fin portion. The first resin may include metallocene-catalyzed linear low density polyethylenes and elastomers. The first resin of the fin portions has a density of from about 0.85 to about 0.94 g/cm$^3$, preferably from about 0.87 to about 0.925 g/cm$^3$, and more preferably from about 0.88 to about 0.920 g/cm$^3$.

According to another embodiment of the present invention, at least one fin portion may be made from a first resin having a polydispersity of from about 1 to about 4 in an amount from about 50 to about 90 wt. % of the fin portion. The first resin may be present in lesser amounts, such as from about 60 to about 85 wt. %, from about 50 to about 75 wt. %, or even from about 50 to about 60 wt. % of the fin portion. The first resin may include ultra low density polyethylenes, elastomers, metallocene-catalyzed linear low density polyethylenes or very low density polyethylenes.

The second resin used in forming at least one fin portion may be a low density polyethylene in an amount of from 0 to about 50 wt. % of the fin portion. The second resin may be present in an amount of from about 10 to about 50 wt. % of the fin portion or from about 15 to about 40 wt. % of the fin portion. The second resin may also be present in a greater amount such as from about 25 to about 50 wt. % of the fin portion or from about 40 to about 50 wt. % of the fin portion. The fin portion may be prepared by coextruding the first resin and the second resin. Alternatively, the fin portions may be comprised of a blend of the first resin and the second resin.

The present invention is equally effective for fins 16 having a number of layers. The fins 16 need not be composed of a single layer made in accordance with this disclosure. Likewise, the fin portions 58 and 64 of FIGS. 4 and 5 need not be composed of a single layer. It is possible to incorporate any number of layers of varying and unlimited composition into a single fin. The object of increasing fin seal integrity is met if at least one of these layers is made in accordance with the present invention. Preferably, that layer is composed of metallocene-catalyzed polyethylene and is facing the body panel so that it is in direct contact with the body panel. A layer of the present invention not in direct contact with the body panel and comprising at least 5 wt. % of the fin 16 or fin portions 58 and 64, however, would also achieve increased fin seal integrity.

The following examples illustrate the effectiveness of the present invention in creating stronger fin seals. Example 3 is discussed below using the Table, while Examples 1 and 2 do not use a table.

EXAMPLE 1

Plastic bags with fins composed of metallocene-catalyzed polyethylene and LDPE were tested and compared to control plastic bags having fins made of LDPE. The fins on the inventive bags were composed of 25 to 100 total weight % metallocene-catalyzed polyethylene. The metallocene-catalyzed polyethylene of the inventive bags was blended with the LDPE prior to extrusion. The metallocene-catalyzed polyethylene of the inventive bags had a density of from about 0.895 to about 0.90, a polydispersity of about 2.0, a melt index of from 1.2 to 16.5, and a melt flow ratio of from 15.0 to 18.0. The LDPE of the inventive and control bags had a density of about 0.918 g/cm$^3$, a polydispersity of 7.5, a melt index of 0.25, and a melt flow ratio of 143.

The fins of the inventive bags and the control bags were tested by means of a "chili test." The first step of the chili test was to heat 30 ounces of store bought chili in a microwave oven to a point near boiling, and the second step was to place the chili in one gallon bags having the fins described above. The bags were placed on their sides in such a manner that the fin seals were in complete contact with the chili. The chili was allowed to remain in the bags for approximately 15 minutes. The inventive bags displayed significant improvements over the LDPE bag in the fin failure rate caused by contact with hot chili. The experiment resulted in none of the inventive fins failing within 15 minutes, but the control bags all failed within one to two minutes of placing the chili within the bag.

EXAMPLE 2

Plastic bags with fins constructed of narrow molecular weight LLDPE, LLDPE-LDPE blends, or metallocene-catalyzed polyethylene were compared to control plastic bags having fins made of LDPE. The LLDPE had a density of 0.918, a polydispersity of 3.5, a melt index of 3.0, and a melt flow ratio of 31. The metallocene-catalyzed polyethylene of the inventive bags had a density of 0.90, a polydispersity of 2.0, a melt index of 3.2, and a melt flow ratio of 17. The LDPE had a density of 0.918 g/cm$^3$, a polydispersity of 7.5, a melt index of 0.25, and a melt flow ratio of 143.

The inventive bags displayed significant improvements over the LDPE bag in the fin failure rate caused by contact with hot chili. The experiment resulted in none of the inventive fins failing within fifteen minutes, but the control bags all failed within one to two minutes of placing the chili within.

EXAMPLE 3 (Table)

Plastic bags with fin portions comprised of various amounts of low density polyethylene (LDPE), ultra low density polyethylene (ULDPE), elastomer, and linear low density polyethylene (LLDPE) were tested. The various compositions of the fin portions (Fins 1–13) are shown in the Table along with the testing results of those compositions. The compositions that comprised more than one resin were blended before forming the fins. Each of the tested fin portions had a thickness of about 6 mil and were formed from a single screw extruder.

The LDPE resin in the Table had a density of 0.9176 g/cm$^3$, and a melt index (MI) of 0.25 g/10 min., while the ULDPE resin had a density of 0.910 g/cm$^3$, and an MI of 2.5 g/10 min. The elastomer in the Table had a density of 0.875 g/cm$^3$, an MI of 3.0 g/10 min., and a polydispersity of from 2.1 to 2.2, while the LLDPE resin had a density of 0.9175 g/cm$^3$, and an MI of 3.2 g/10 min.

The body panels of the plastic bags were comprised of 100% LDPE with a density of 0.923 g/cm$^3$ and an MI of 2.1 g/10 min. The male and female profiles were comprised of an LDPE and a high density polyethylene (HDPE).

The fin portions of the Table were tested by means of a chili test, a fin tear test, a fin separation test, a 3 foot and a 6 foot drop test, and a toughness test. The chili test was performed in a similar manner as described above in Example 1, except that the fin portions tested in Example 3 were tamper evident fins, as shown in FIGS. 4 and 5. Five samples of each tamper resistant fin composition (Fins 1–13) were tested in the chili test. The tamper resistant fin was visually examined after the chili test and assigned a "pass" or a "fail." A "fail" included any type of break or crack in the fin that resulted in the chili leaking.

The fin tear test took a 1 inch length of a track with a tamper resistant fin. The jaws of an Instron machine grasped a portion of the male profile and a portion of the female profile. The jaws of the Instron machine moved the profiles apart and measured the force at break. Five samples of each fin composition (Fins 1–13) were tested for the fin tear test.

The fin separation test tested the force for both the male and female tracks. The male and female tracks were prepared by cutting the tamper resistant fin. The fin separation test of the male track first took a 1 inch length of a male track. The jaws of the Instron machine grasped a portion of the male profile and a portion of the male fin and moved the male profile and male fin apart. The Instron machine then measured the force at break in which the break may occur at any location. The female track was tested in the same manner as described above with the male track. Five samples of each fin composition (Fins 1–13) were tested in the fin separation test.

The drop tests were performed by placing 40 lbs of dirt in plastic bags comprised of various fin compositions (Fins 1–13) that were tamper evident. The filled bags were dropped from heights of 3 feet and 6 feet. Ten bags were dropped from 3 feet for each fin composition. Each of the ten bags was dropped on each side and each end. Therefore, each of the ten bags was dropped a total of six times. Each tamper evident fin of the bags was visually inspected after the 3 foot drop test and assigned a "pass" or a "fail." A "fail" was assigned if a fin portion separated from a remainder of the fin portion or if a fin portion at its original seal separated from its body panel. The bags assigned a "pass" in the 3 foot drop test were then tested at a height of 6 feet in a similar manner. Therefore, the number of tested bags for the various fin compositions of the Table varied in the 6 foot drop test.

The toughness test was performed in accordance with ASTM D882. The toughness test took a 1 inch length of a track including the profiles and tamper resistant fin. The jaws of an Instron machine grasped a portion of the male profile and a portion of the female profile. The jaws of the Instron machine moved the profiles apart and measured the force at break. Five samples of each fin composition (Fins 1–13) were tested for toughness in accordance with ASTM D882.

The results of the various tests discussed above are in the following Table.

chili test. The 100 wt. % elastomer appeared to fail the chili test because the temperature of the chili was above the softening point of the pure elastomer. The 100 wt. % LDPE unexpectedly passed 4/5 even though the toughness of the 100 wt. % LDPE bag was extremely poor.

TABLE

| Fin Composition | 1 | 2 | 3 | 4 | 5 | 6 | 7 | 8 | 9 | 10 | 11 | 12 | 13 |
|---|---|---|---|---|---|---|---|---|---|---|---|---|---|
| LDPE[1] (wt. %) | 25 | 25 | 25 | 50 | 50 | 50 | 75 | 75 | 75 | 100 | | | |
| ULDPE[2] (wt. %) | 75 | | | 50 | | | 25 | | | | 100 | | |
| Elastomer[3] (wt. %) | | 75 | | | 50 | | | 25 | | | | 100 | |
| LLDPE[4] (wt. %) | | | 75 | | | 50 | | | 25 | | | | 100 |
| Testing | | | | | | | | | | | | | |
| Chili Test (#pass/#tested) | 5/5 Pass | 5/5 Pass | 5/5 Pass | 5/5 Pass | 5/5 Pass | 5/5 Pass | 5/5 Pass | 5/5 Pass | 5/5 Pass | 4/5 Pass | 5/5 Pass | 0/5 Pass | 5/5 Pass |
| Average Fin Tear Force (lbs) | 11.9 | 11.2 | 13.6 | 8.3 | 11.4 | 9.6 | 5.9 | 10.2 | 7.2 | 4.2 | 10.7 | 8.9 | 15.2 |
| Average Male Fin Separation Force (lbs) | 11.9 | 17 | 13.1 | 11.9 | 14 | 13 | 10.7 | 10.4 | 12 | 9.3 | 10.7 | 11.8 | 19.1 |
| Average Female Fin Separation Force (lbs) | 13.8 | 12.3 | 13.3 | 9.6 | 11.1 | 11.4 | 7.5 | 11.2 | 8.9 | 5.8 | 13.1 | 13.1 | 15.7 |
| 3 Foot Drop Test (#pass/#tested) | 4/10 Pass | 9/10 Pass | 1/10 Pass | 0/10 Pass | 9/10 Pass | 0/10 Pass | 0/10 Pass | 0/10 Pass | 0/10 Pass | 0/10 Pass | 8/10 Pass | 9/10 Pass | 10/10 Pass |
| 6 Foot Drop Test (#pass/#tested) | 2/4 Pass | 8/9 Pass | 0/1 Pass | NA[5] | 7/9 Pass | NA[5] | NA[5] | NA[5] | NA[5] | NA[5] | 5/8 Pass | 8/9 Pass | 9/10 Pass |
| Toughness (ftlb/in$^3$) | 389 | 368 | 373 | 277 | 357 | 320 | 80.5 | 254 | 184 | 5.4 | 471 | 247 | 577 |

[a]An LDPE resin having a density of 0.9176 g/cm$^3$ and a melt index (MI) of 0.25 g/10 min.
[2]An ULDPE resin having a density of 0.910 g/cm$^3$ and an MI of 2.5 g/10 min.
[3]A elastomer having a density of 0.875 g/cm$^3$ and an MI of 3.0 g/10 min.
[4]An LLDPE resin having a density of 0.9175 g/cm$^3$/and an MI of 3.2 g/10 min.
[5]Not tested since all 10 bags failed 3 foot drop test.

The low percentage elastomer/LDPE fin blend (Fin 8) showed good toughness as compared to the lower percentage ULDPE/LDPE and LLDPE/LDPE blends (Fins 7 and 9). Specifically, Fin 8 had a toughness of 254.4 ftlb/in$^3$, while Fins 7 and 9 had toughnesses of 80.5 and 184.3 ftlb/in$^3$, respectively. The toughness of the elastomer blends at the higher levels (Fins 2 and 5) were similar or improved as compared to the toughness of the ULDPE and LLDPE blends (Fins 1, 3, 4 and 6). The toughness of the 100 wt. % ULDPE fin (Fin 11) and the 100 wt. % LLDPE fin (Fin 13), however, was much higher than the toughness of the 100 wt. % elastomer fin (Fin 12), as shown in the Table. See the Table and compare 471 ftlb/in$^3$ (ULDPE) and 577 ftlb/in$^3$ (LLDPE) vs. 247 ftlb/ft$^3$ (elastomer). The toughness of the 100 wt. % LDPE fin (Fin 10) was extremely poor (5.4 ftlb/ft$^3$) as compared to Fins 11–13 discussed above.

The plastics bags having elastomer fins with 50 or 75 wt. % elastomer (Fins 2 and 5) showed excellent results in the 3 and 6 foot drop tests. The elastomer/LDPE blends had much better results than the blends of ULDPE/LDPE and LLDPE/LDPE in the 3 and 6 foot drop tests. See the 3 foot and 6 foot drop tests for Fins 1–6 in the Table. For example, the bags with a 50 wt. % elastomer/LDPE blend (Fin 5) passed 9/10 in the 3 foot drop test and passed 7/9 in the 6 foot drop test. The 50 wt. % ULDPE/LDPE blend and the 50 wt. % LLDPE/LDPE blend did not pass any of its bags in the 3 foot drop test. See Fins 4 and 6 in the Table. The 75 wt. % ULDPE/25 wt. % LDPE blend passed 4 out of 10 bags in the 3 foot drop test, while the 75 wt. % LLDPE/25 wt. % LLDPE blend passed only 1 out 10 bags in the 3 foot drop test.

As shown in the Table, the 5 bags with a 100 wt. % elastomer fin failed the chili test, while each of the 5 bags with 100 wt. % ULDPE and 100 wt. % LLDPE passed the While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A zippered plastic bag comprising:
    first and second panels each having a top, a bottom, and first and second opposing sides, said first and second panels being joined to each other along their respective bottoms, their respective first opposing sides, and their respective second opposing sides; and
    a zipper including a male and female track, said male track including a male profile and a first fin portion, said first fin portion being affixed to said first panel in proximity to said top of said first panel, said female track including a female profile and a second fin portion, said second fin portion being affixed to said second panel in proximity to said top of said second panel, said male and female profiles having complementary cross-sections, said first and second fin portions being attached, at least one of said fin portions made from a first resin which is prepared in the presence of a single site catalyst, said first resin having a polydispersity of from about 2 to about 3, a melt index of from about 0.2 to about 20 g/10 min., and a melt flow ratio of from about 12 to about 35, and a second resin which is a low density polyethylene, at least one of said fin portions comprising from about 5 to about 50 wt. % of said first resin, and from about 50 to about 95 wt. % of said second resin; and
    a slider being located on said zipper, said slider cooperating with said zipper in opening and closing said plastic bag by moving along said male and female tracks.

2. The plastic bag of claim 1, wherein said first resin is prepared in the presence of a metallocene catalyst.

3. The plastic bag of claim 1, wherein said first resin has a density of from about 0.85 to about 0.94 g/cm$^3$.

4. The plastic bag of claim 1, wherein said first and second fin portions each have lower edges, said lower edges of said first and second fin portions are attached to form a one time openable tamper evident feature.

5. The plastic bag of claim 1, wherein said first resin has a melt flow ratio of from about 12 to about 31.

6. The plastic bag of claim 1, wherein said first resin has a melt index of from about 1 to about 17 g/10 min.

7. The plastic bag of claim 1, wherein each of said first and second fin portions comprises from about 5 to about 50 wt. % of said first resin, and from about 50 to about 95 wt. % of said second resin.

8. The plastic bag of claim 7, wherein each of said first and second fin portions comprises from about 25 to about 50 wt. % of said first resin, and from about 50 to about 75 wt. % of said second resin.

9. The plastic bag of claim 7, wherein each of said first and second fin portions comprises from about 5 to about 25 wt. % of said first resin, and from about 75 to about 95 wt. % of said second resin.

10. The plastic bag of claim 9, wherein each of said first and second fin portions comprises from about 10 to about 15 wt. % of said first resin, and from about 85 to about 90 wt. % of said second resin.

11. The plastic bag of claim 9, wherein each of said first and second fin portions comprises from about 15 to about 25 wt. % of said first resin, and from about 75 to about 85 wt. % of said second resin.

12. The plastic bag of claim 1, wherein at least one of said fin portions is prepared by coextruding the first resin and said second resin.

13. The plastic bag of claim 1, wherein at least one of said fin portions comprises a blend of the first resin and said second resin.

14. A zippered plastic bag comprising:
    first and second panels each having a top, a bottom, and first and second opposing sides, said first and second panels being joined to each other along their respective bottoms, their respective first opposing sides, and their respective second opposing sides; and
    a zipper including a male and female track, said male track including a male profile and a first fin portion, said first fin portion being affixed to said first panel in proximity to said top of said first panel, said female track including a female profile and a second fin portion, said second fin portion being affixed to said second panel in proximity to said top of said second panel, said male and female profiles having complementary cross-sections, said first and second fin portions are attached, at least one of said fin portions made from a first resin selected from the group consisting of an ultra low density polyethylene, a very low density polyethylene, a metallocene-catalyzed polyethylene, and an elastomer, said first resin having a polydispersity of from about 1 to about 4, a melt index of from about 0.2 to about 20 g/10 min., and a melt flow ratio of from about 12 to about 35, and a second resin which is a low density polyethylene, at least one of said fin portions comprising from about 5 to about 50 wt. % of said first resin, and from about 50 to about 95 wt. % of said second resin; and
    a slider being located on said zipper, said slider cooperating with said zipper in opening and closing said plastic bag by moving along said male and female tracks.

15. The plastic bag of claim 14, wherein said first resin is a copolymer of ethylene and at least one alpha olefin.

16. The plastic bag of claim 14, wherein said first resin is an ultra low density polyethylene.

17. The plastic bag of claim 14, wherein said first resin is a very low density polyethylene.

18. The plastic bag of claim 14, wherein said first resin is a metallocene-catalyzed polyethylene.

19. The plastic bag of claim 14, wherein said first resin is an elastomer.

20. The plastic bag of claim 14, wherein said first resin has a density of from about 0.85 to about 0.94 g/cm$^3$.

21. The plastic bag of claim 14, wherein said first resin has a polydispersity of from about 1.5 to about 4.

22. The plastic bag of claim 21, wherein said first resin has a polydispersity of from about 2 to about 4.

23. The plastic bag of claim 14, wherein said first resin has a melt flow ratio of from about 12 to about 31.

24. The plastic bag of claim 14, wherein said first resin has a melt index of from about 1 to about 17 g/10 min.

25. The plastic bag of claim 14, wherein said first and second fin portions each have lower edges, said lower edges of said first and second fin portions are attached to form a one time openable tamper evident feature.

26. The plastic bag of claim 14, wherein each of said first and second fin portions comprises from about 5 to about 50 wt. % of said first resin, and from about 50 to about 95 wt. % of said second resin.

27. The plastic bag of claim 26, wherein each of said first and second fin portions comprises from about 25 to about 50 wt. % of said first resin, and from about 50 to about 75 wt. % of said second resin.

28. The plastic bag of claim 26, wherein each of said first and second fin portions comprises from about 5 to about 25 wt. % of said first resin, and from about 75 to about 95 wt. % of said second resin.

29. The plastic bag of claim 28, wherein each of said first and second fin portions comprises from about 10 to about 15 wt. % of said first resin, and from about 85 to about 90 wt. % of said second resin.

30. The plastic bag of claim 28, wherein each of said first and second fin portions comprises from about 15 to about 25 wt. % of said first resin, and from about 75 to about 85 wt. % of said second resin.

31. The plastic bag of claim 14, wherein at least one of said fin portions is prepared by coextruding the first resin and said second resin.

32. The plastic bag of claim 14, wherein at least one of said fin portions comprises a blend of the first resin and said second resin.

33. A zippered plastic bag comprising:
    first and second panels each having a top, a bottom, and first and second opposing sides, said first and second panels being joined to each other along their respective bottoms, their respective first opposing sides, and their respective second opposing sides; and
    a zipper including a male and female track, said male track including a male profile and a first fin portion, said first fin portion being affixed to said first panel in proximity to said top of said first panel, said female track including a female profile and a second fin portion, said second fin portion being affixed to said second panel in proximity to said top of said second panel, said male and female profiles having complementary cross-sections, at least one of said fin portions made from a first resin which is prepared in the presence of a single site catalyst, said first resin having a, polydispersity of from about 2 to about 3, a melt index of from about 0.2 to about 20 g/10 min., and a melt flow ratio of from about 12 to about 35, and a second resin which is a low density polyethylene, at least one of said fin portions comprising from about 50 to 100 wt. % of said first resin, and from 0 to about 50 wt. % of said second resin; and a slider being located on said zipper, said slider cooperating with said zipper in opening and closing said plastic bag by moving along said male and female tracks.

34. The plastic bag of claim 33, wherein said first and second fin portions are attached.

35. The plastic bag of claim 34, in said first and second fin portions have lower edges, said lower edges are attached to form a one time openable tamper evident feature.

36. The plastic bag of claim 33, wherein said first resin is prepared in the presence of a metallocene catalyst.

37. The plastic bag of claim 33, wherein said first resin is an elastomer.

38. The plastic bag of claim 33, wherein at least one of said fin portions comprises from about 50 to about 90 wt. % of said first resin, and from about 10 to about 50 wt. % of said second resin.

39. The plastic bag of claim 38, wherein at least one of said fin portions comprises from about 60 to about 85 wt. % of said first resins and from about 15 to about 40 wt. % of said second resin.

40. The plastic bag of claim 38, wherein at least one of said fin portions comprises from about 50 to about 75 wt. % of said first resin, and from about 25 to about 50 wt. % of said second resin.

41. The plastic bag of claim 40, wherein at least one of said fin portions comprises from about 50 to about 60 wt. % of said first resin, and from about 40 to about 50 wt. % of said second resin.

42. The plastic bag of claim 33, wherein each of said fin portions comprises from about 50 to 100 wt. % of said first resin, and from 0 to about 50 wt. % of said second resin.

43. The plastic bag of claim 42, wherein each of said fin portions comprises from about 50 to about 90 wt. % of said first resin, and from about 10 to about 50 wt. % of said second resin.

44. The plastic bag of claim 43, wherein each of said fin portions comprises from about 60 to about 85 wt. % of said first resin, and from about 15 to about 40 wt. % of said second resin.

45. The plastic bag of claim 43, wherein each of said fin portions comprises from about 50 to about 75 wt. % of said first resin, and from about 25 to about 50 wt. % of said second resin.

46. The plastic bag of claim 45, wherein each of said fin portions comprises from about 50 to about 60 wt. % of said first resin, and from about 40 to about 50 wt. % of said second resin.

47. The plastic bag of claim 33, wherein at least one of said fin portions is prepared by coextruding the first resin and said second resin.

48. The fastener of claim 33, wherein at least one of said fin portions comprises a blend of the first resin and said second resin.

49. A zippered plastic bag comprising:

first and second panels each having a top, a bottom, and first and second opposing sides, said first and second panels being joined to each other along their respective bottoms, their respective first opposing sides, and their respective second opposing sides; and a zipper including a male and female track, said male track including a male profile and a first fin portion, said first fin portion being affixed to said first panel in proximity to said top of said first panel, said female track including a female profile and a second fin portion, said second fin portion being affixed to said second panel in proximity to said top of said second panel, said male and female profiles having complementary cross-sections, at least one of said fin portions is made from a first resin that is an ultra low density polyethylene, a metallocene-catalyzed linear low density polyethylene, or a very low density polyethylene, said first resin having a polydispersity of from about 1 to about 4, a melt index of from about 0.2 to about 20 g/10 min., and a melt flow ratio of from about 12 to about 35, and a second resin which is a low density polyethylene, at least one of said fin portions comprising from about 50 to about 90 wt. % of said first resin, and from about 10 to about 50 wt. % of said second resin; and a slider being located on said zipper, said slider cooperating with said zipper in opening and closing said plastic bag by moving along said male and female tracks.

50. The plastic bag of claim 49, wherein said first and second fin portions are attached.

51. The plastic bag of claim 50, wherein said first and second fin portions have lower edges, said lower edges are attached to form a one time openable tamper evident feature.

52. The plastic bag of claim 49, wherein said first resin is an ultra low density polyethylene.

53. The plastic bag of claim 49, wherein said first resin is a very low density polyethylene.

54. The plastic bag of claim 49, wherein said first resin is a metallocene-catalyzed polyethylene.

55. The plastic bag of claim 49, wherein said first resin is an ultra low density polyethylene and wherein at least one of said fin portions comprises from about 25 to about 75 wt. % of said first resin, and from about 25 to about 75 wt. % of said second resin.

56. The plastic bag of claim 49, wherein at least one of said fin portions comprises from about 60 to about 85 wt. % of said first resin, and from about 15 to about 40 wt. % of said second resin.

57. The plastic bag of claim 49, wherein at least one of said fin portions comprises from about 50 to about 75 wt. % of said first resin, and from about 25 to about 50 wt. % of said second resin.

58. The plastic bag of claim 57, wherein at least one of said fin portions comprises from about 50 to about 60 wt. % of said first resin, and from about 40 to about 50 wt. % of said second resin.

59. The plastic bag of claim 49, wherein each of said fin portions comprises from about 50 to about 90 wt. % of said first resin, and from about 10 to about 50 wt. % of said second resin.

60. The plastic bag of claim 59, wherein each of said fin portions comprises from about 60 to about 85 wt. % of said first resin, and from about 15 to about 40 wt. % of said second resin.

61. The plastic bag of claim 59, wherein each of said fin portions comprises from about 50 to about 75 wt. % of said first resin, and from about 25 to about 50 wt. % of said second resin.

62. The plastic bag of claim 61, wherein each of said fin portions comprises from about 50 to about 60 wt. % of said first resin, and from about 40 to about 50 wt. % of said second resin.

63. The plastic bag of claim 49, wherein at least one of the fins is prepared by coextruding the first resin and said second resin.

64. The plastic bag of claim 49, wherein at least one of said fin portions comprises a blend of the first resin and said second resin.

65. A zippered plastic bag comprising:

first and second panels each having a top, a bottom, and first and second opposing sides, said first and second panels being joined to each other along their respective bottoms, their respective first opposing sides, and their respective second opposing sides; and a zipper including a male and female track, said male track including a male profile and a first fin portion, said first fin portion being affixed to said first panel in proximity to said top of said first panel, said female track including a female profile and a second fin portion, said second fin portion being affixed to said second panel in proximity to said top of said second panel, said male and female profiles having complementary cross-sections, at least one of said fin portions made from a first resin being an ultra low density polyethylene, said first resin having a polydispersity of from about 1 to about 4, a melt index of from about 0.2 to about 20 g/10 min., and a melt flow ratio of from about 12 to about 35, and a second resin which is a low density polyethylene, at least one of said fin portions comprising from about 25 to about 75 wt. % of said first resin, and from about 25 to about 75 wt. % of said second resin; and a slider being located on said zipper, said slider cooperating with said zipper in opening and closing said plastic bag by moving along said male and female tracks.

66. The plastic bag of claim 65, wherein said first and second fin portions are attached.

\* \* \* \* \*